UNITED STATES PATENT OFFICE.

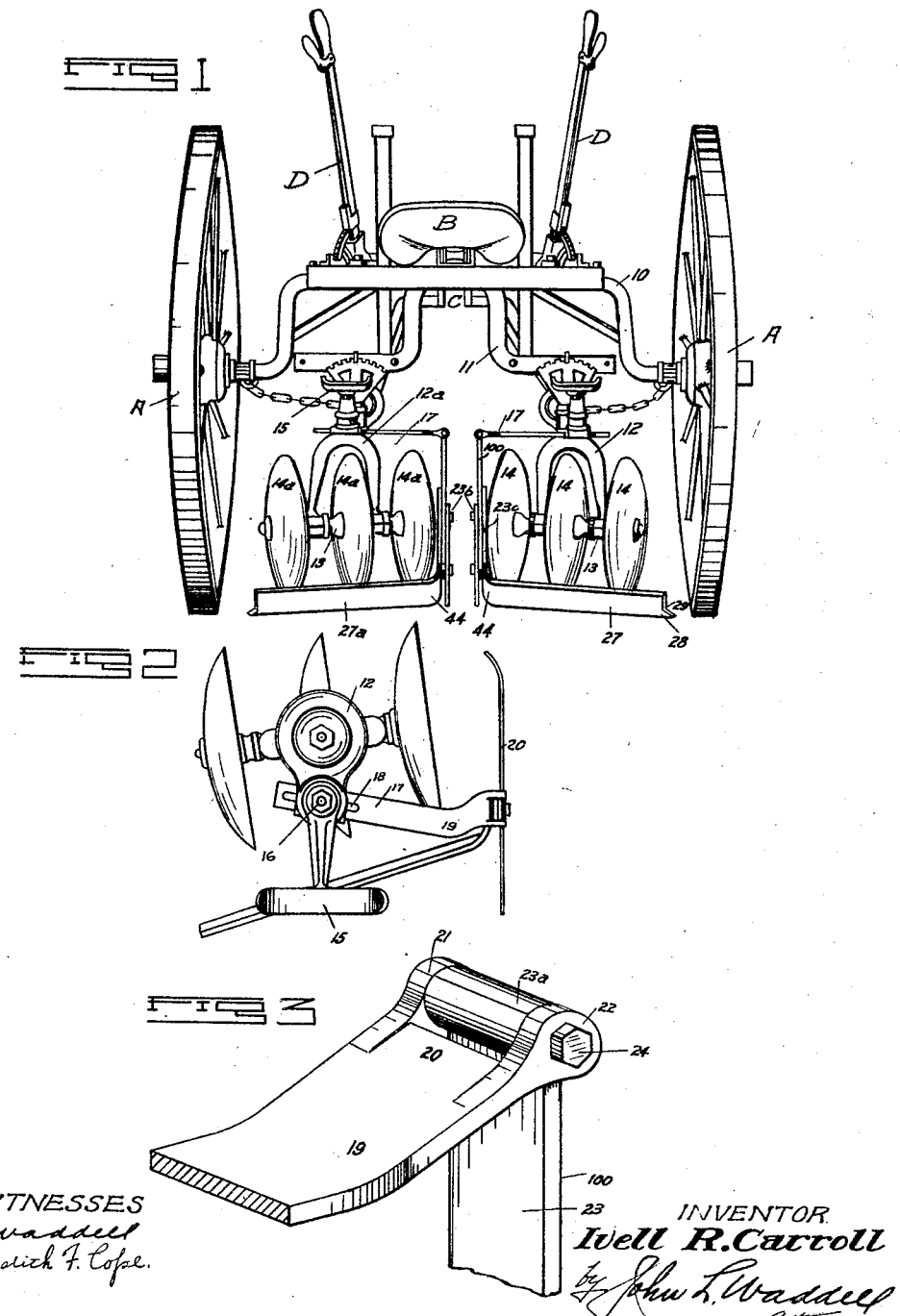

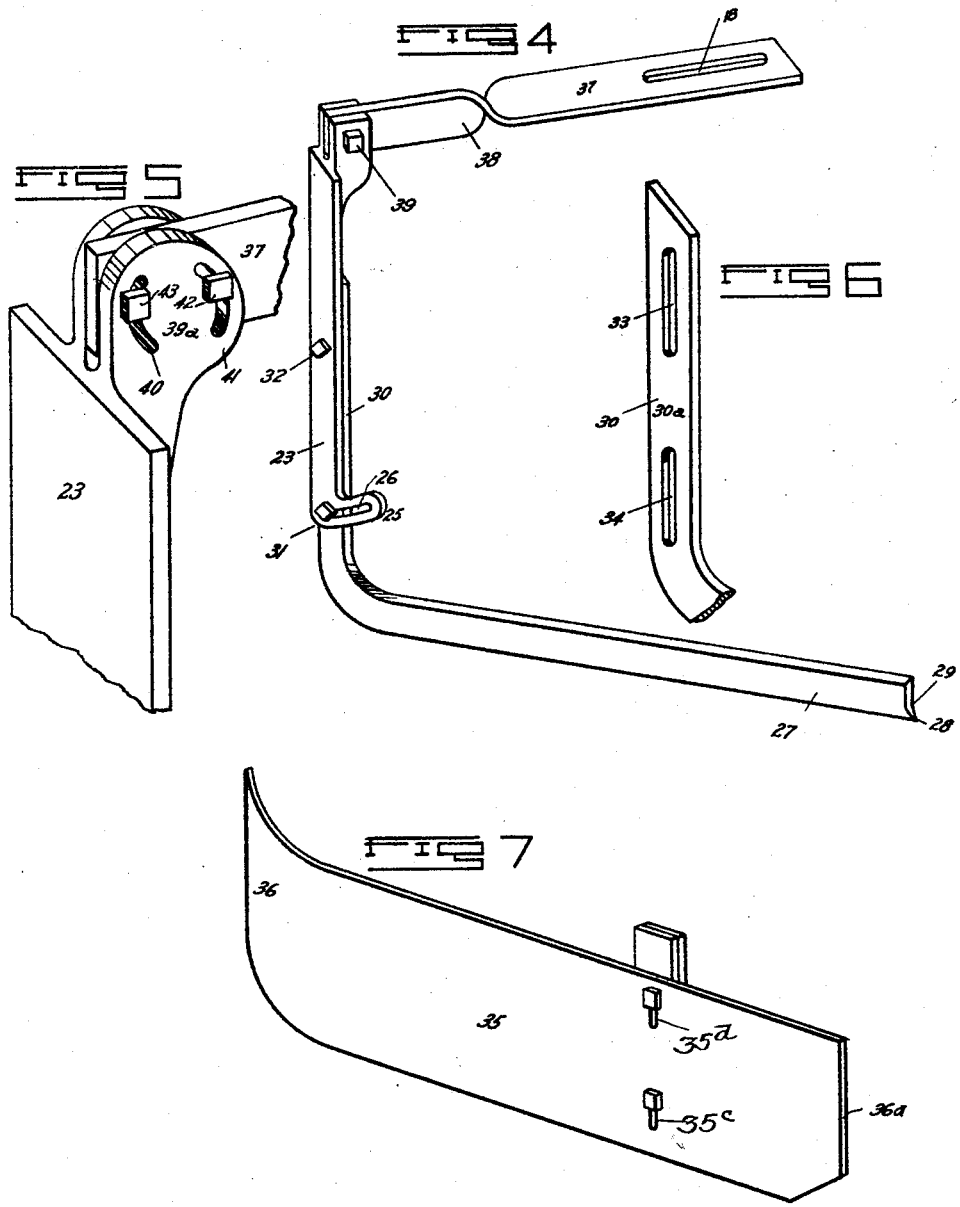

IVELL R. CARROLL, OF MILMINE, ILLINOIS.

CULTIVATOR.

1,109,661.  Specification of Letters Patent.  Patented Sept. 8, 1914.

Application filed March 13, 1911. Serial No. 614,233.

*To all whom it may concern:*

Be it known that I, IVELL R. CARROLL, a citizen of the United States, and a resident of Milmine, Piatt county, State of Illinois, have invented certain new and useful Improvements in Cultivators; and my preferred manner of carrying out the invention is set forth in the following full, clear, and exact description, terminating with claims particularly specifying the novelty.

My invention relates to improvements in cultivators and particularly to leveling devices attachable thereto.

The principal object of my invention is the provision of such a device which will shear off or level the ridges formed by the disks or plows and fill up the depressions formed thereby, whereby the earth between the rows of the crop is leveled and spread evenly.

Further objects include the provision of such a device which is readily adjustable and the provision of a fender for the protection of the growing crop during the passage of the cultivator.

The preferred form of construction and general arrangement of parts included in my invention will be described more fully hereinafter, it being understood that changes may be made within the scope of the claims without digressing from my inventive idea.

In the drawings,—Figure 1 represents a rear elevation of a disk cultivator with my invention applied thereto. Fig. 2 is a top plan view of one of the cultivator sections and attachments. Fig. 3 is a perspective of one form of a joint of the leveling device. Fig. 4 is a perspective view of one leveling member showing forms of attachment and adjustment. Fig. 5 is a detail of another form of joint or knuckle. Fig. 6 is a detail of part of the leveling device. Fig. 7 is a perspective view of one of the fenders.

Referring to the drawings and to Figs. 1 and 2 particularly, wherein is just merely for the purpose of illustrative disclosure, a disk type of cultivator, 10 designates the main or primary frame carried by wheels A and supporting seat B and tongue C. Mounted on the main or primary frame are levers D for raising and lowering the supplemental or secondary frame 11. To this frame 11 are attached the supports 12 and 12$^a$ supporting the cultivator sections 13 which include the disks 14 and 14$^a$, as shown. Pedals 15 are suitably connected to the supports 12 and 12$^a$ by means of the nut and bolt connection 16 for the purpose of regulating the disks.

My leveling attachment, now to be described, includes the horizontally extending arm 17 having an elongated slot 18 in its outer end portion whereby it is adjustably held by said nut and bolt connection 16. To the end of the arm 17 is pivotally and adjustably connected the hanger member 23, one form of the joint or knuckle being shown in detail in Fig. 3. The end 20 of arm 17 is provided with spaced apertured ears 21 and 22, between which is received the sleeve 23$^a$ on the end of hanger 23, the connection being made by the nut and bolt connection 24. Other forms of this joint or knuckle are shown in Figs. 4 and 5. As shown in Fig. 4, the hanger 23 depends from said joint and has at its lower end the extension 25 having slot 26 therein, said slot being formed on a slight curve as shown. This hanger supports the leveling blade member 27 having the leveled or sharpened edge 28, said blade member being concave as illustrated at 29. Extending upwardly from said blade member and formed integrally therewith is the attaching arm 30, which arm is adjustably connected to hanger 23 by the nut and bolt connections 31 and 32 having the elongated slots 33 and 34 for that purpose. The face 30$^a$ of said arm is parallel to and adapted to engage hanger 23 while the blade member is turned away to extend obliquely as shown in Figs. 1 and 2, the bend 44 at the elbow being "easy" to eliminate sharp corners or edges. The bolt 32 passes through an aperture in hanger 23 and slot 33, while bolt 31 passes through slots 26 and 34, so that the blade member is moved on bolt 32 as a pivot to its desired adjustment whereby it may be changed to suit various working conditions. An offset 19 is provided in arms 17 to properly position the hangers.

In cultivating corn, the blades operate on the earth between the rows, each row passing through the space between the cultivator sections. In order to prevent damage to the corn, I provide fenders 35, the forward extremity of which is curved as at 36, the rear extremity 36$^a$ being blunt. Each fender is provided with slots 35$^c$ and 35$^d$ to receive said bolts 31 and 32, whereby the fenders may be adjusted relative to the surface of the ground.

By mounting all of the parts on the cultivator section, they may be controlled by the levers and foot pedals. For instance, should there be an uneven row, the cultivator section may be readily moved by the pedal to prevent injuring or cutting the "checks" in the rows.

As shown in Fig. 4, the arm 37, corresponding to arm 17, may be twisted as at 38 to present itself edgewise between the spaced apertured ears 39' on the upper end of hanger 23, the bolt and nut 39 connecting the same. A further modification of this joint is shown at 39ª in Fig. 5, wherein I provide in the spaced ears 41 the curved slots 40 to receive the nut and bolt connections 42 and 43.

In the operation of the usual cultivator, the earth is thrown up in ridges or hills between the rows and it is the object of my invention to prevent this. My leveling device scrapes or cuts the ridges, moving the earth into the depressions or furrows, thereby leveling the surface of the ground. The surplus earth passes lengthwise of the blades and over the same, being spread out evenly back of the blades.

What I claim as new is—

1. In combination, a cultivator having a plurality of cultivator sections, an arm adjustably connected to each section having a hanger pivotally and adjustably connected to its inner end, a blade member adjustably attached to the lower portion of each hanger, said blade members being spaced apart and extending obliquely to the line of draft.

2. In combination, a cultivator having a plurality of cultivator sections, an arm adjustably connected to each section having a hanger pivotally and adjustably connected to its inner end, a blade member adjustably attached to the lower portion of each hanger, said blade members being spaced apart and extending obliquely to the line of draft, the adjustment for said blade members being provided by a curved slot at the lower end of each hanger and an aperture thereabove, elongated slots in said blade member and securing means passing through said curved slot and aperture and said elongated slots whereby the adjustment may be made as to height and angular relation.

3. In combination, a cultivator having a plurality of cultivator sections, an arm adjustably connected to each section having a hanger pivotally and adjustably connected to its inner end, a blade member adjustably attached to the lower portion of each hanger, said blade members being spaced apart and extending obliquely to the line of draft, and fenders adjustably secured to said hangers and extending forwardly therefrom to prevent injury to the growing crop.

4. An attachment for an agricultural implement comprising an arm slotted so as to be capable of adjustable attachment thereto, a hanger adjustably pivoted to one end of said arm, and a blade member adjustably connected to said hanger, said blade member including an attaching portion extending parallel to said hanger and a blade proper extending obliquely therefrom.

5. An attachment for an agricultural implement comprising an arm slotted so as to be capable of adjustable attachment thereto, a hanger adjustably pivoted to one end of said arm, and a blade member adjustably connected to said hanger, said blade member including an attaching portion extending parallel to said hanger and a blade proper extending obliquely therefrom, and a fender adjustably attached to said hanger.

In testimony whereof, I have hereunto subscribed my signature, this 7th day of February, A. D. 1911.

IVELL R. CARROLL.

Witnesses:
EDITH F. COPE,
JOHN L. WADDELL.

Copies of this patent may be obtained for five cents each, by addressing the "Commissioner of Patents, Washington, D. C."